US006268467B1

(12) United States Patent
Lai et al.

(10) Patent No.: US 6,268,467 B1
(45) Date of Patent: *Jul. 31, 2001

(54) HYDROXY OR AMINO TERMINATED HYDROPHILIC POLYMERS

(75) Inventors: Yu-Chin Lai, Pittsford; Richard M. Ozark, Solvay, both of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,064

(22) Filed: Dec. 22, 1999

Related U.S. Application Data

(63) Continuation-in-part of application No. 09/079,779, filed on May 15, 1998, now Pat. No. 6,008,317.
(51) Int. Cl.$^7$ .................................................. C08G 75/04
(52) U.S. Cl. .......................... 528/374; 528/367; 528/369; 525/88; 525/157; 525/205; 525/266; 525/213
(58) Field of Search ................................... 528/374, 367, 528/369; 525/88, 157, 265, 266, 213

(56) References Cited

U.S. PATENT DOCUMENTS

| 5,034,461 | 7/1991 | Lai et al. ............................. 525/100 |
| 5,128,434 | 7/1992 | Lai ....................................... 528/65 |
| 5,451,651 | 9/1995 | Lai ...................................... 526/302 |
| 5,523,373 | 6/1996 | Esselborn et al. ..................... 528/26 |
| 5,532,398 | 7/1996 | Wolter et al. .......................... 528/26 |
| 5,969,076 | * 10/1999 | Lai et al. ............................. 528/28 |
| 6,008,317 | * 12/1999 | Lai et al. ............................ 528/374 |

FOREIGN PATENT DOCUMENTS

| 0205846 | 12/1986 | (EP) . |
| 0362145 | 4/1990 | (EP) .............................. C08G/18/61 |
| 0367720 | 5/1990 | (EP) .............................. C08G/18/61 |
| 96/15157 | 5/1986 | (WO) . |
| 94/29756 | 12/1994 | (WO) . |
| 95/12568 | 5/1995 | (WO) . |

* cited by examiner

*Primary Examiner*—Duc Truong
(74) *Attorney, Agent, or Firm*—John E. Thomas

(57) ABSTRACT

The present invention generally relates to certain hydrophilic polymers. These polymers undergo negligible shrinkage when polymerized and are highly hydrophilic, rendering them useful in a variety of applications.

13 Claims, No Drawings

HYDROXY OR AMINO TERMINATED HYDROPHILIC POLYMERS

This application is a continuation-in-part of Ser. No. 09/079,779, filed May 15, 1998, now U.S. Pat. No. 6,008,317.

BACKGROUND OF THE INVENTION

The present invention generally relates to certain hydrophilic polymers. These polymers undergo negligible shrinkage when polymerized and are highly hydrophilic, rendering them useful in a variety of applications.

SUMMARY OF THE INVENTION

This invention relates to hydrophilic polymers of the formula (I):

$$X-(M)_n-(Y)_p \quad (I)$$

wherein:
X is derived from a chain transfer agent and includes a terminal hydroxyl or amino radical;
Y is derived from an ethylenically unsaturated monomer that includes a terminal hydroxyl or amino radical;
M is derived from a hydrophilic ethylenically unsaturated monomer;
n is about 5 to 50; and
p is 0 to 5, preferably 1.

One preferred class of the formula (I) hydrophilic polymers are polymers of the formula (Ia):

$$X-((M')_x(M'')_y(M''')_z)-(Y)_p \quad (Ia)$$

wherein:
X, Y and p are as defined for formula (I);
Y is derived from an ethylenically unsaturated monomer that includes a terminal hydroxyl or amino radical;
M' is derived from a first hydrophilic ethylenically unsaturated monomer;
M'' is derived from a second hydrophilic ethylenically unsaturated monomer;
M''' is derived from a hydrophobic ethylenically unsaturated monomer;
each of x and y is at least one, and x+y is about 5 to 50; and
z is 0 to 20.

The invention further provides ethylenically endcapped derivatives of these compounds, and thermoplastic polymers prepared therefrom.

DETAILED DESCRIPTION OF PREFERRED EMBODIMENTS

The hydroxy- or amino-terminated hydrophilic polymers of formulae (I) and (Ia) are derived from an ethylenically unsaturated hydrophilic monomer. Preferred hydrophilic monomeric precursors, represented by M' and M'' in formula (Ia), are N-vinyl lactams, such as N-vinyl pyrrolidone (NVP), and (meth)acrylamides, such as N,N-dimethyl acrylamide (DMA) and N-octyl acrylamide (NOA). Optionally, the hydrophilic polymers may be derived from an additional ethylenically unsaturated hydrophobic monomeric precursor, represented by M''' in formula (Ia), provided that this hydrophobic monomeric is present in a sufficiently lower molar ratio than the hydrophilic monomeric precursor so that the resultant polymer remains predominantly hydrophilic. Representative hydrophobic monomeric precursors are $(C_1-C_{20})$ alkyl(meth)acrylate, $(C_1-C_{20})$ fluoroalkyl (meth)kicrylate, $(C_1-C_{20})$ alkyl(meth)acrylamide, or $(C_1-C_{20})$ fluoroalkyl(meth)acrylamide.

The ethylenically unsaturated hydrophilic monomers, and the ethylenically unsaturated hydrophobic monomers if present, are polymerized in the presence of a chain transfer agent which serves to control the molecular weight of the resultant polymer and provides hydroxy- or amino- functionality to the resultant polymer. Suitable chain transfer agents include mercapto alcohols (also referred to as hydroxymercaptans) and aminomercaptans. Preferred chain transfer agents include 2-mercaptoethanol and 2-aminoethanethiol, Accordingly, the chain transfer agent forms a terminal end of the hydrophilic polymer, with the hydroxy radical (in the case of a mercapto alcohol) providing the resultant polymer with terminal hydroxyl functionality, and the amino radical (in the case of a aminomercaptan) providing the resultant polymer with terminal amino functionality. Generally, the molar ratio of chain transfer agent to the total hydrophilic and hydrophobic monomer precursors will be about 1:5 to about 1:100.

The ethylenically unsaturated hydrophilic monomers, the ethylenically unsaturated hydrophobic monomer if present, and the chain transfer agent are copolymerized with another monomer having ethylenic unsaturation and a hydroxy- or amino- radical. Accordingly, this additional monomer is also reactive with the hydrophilic monomers and also provides terminal hydroxy- or amino- functionality to the resultant polymer. Suitable monomers include alcohol esters of (meth)acrylic acid such as 2-hydroxyethylmethacrylate (Hema), allyl alcohol, amino esters of (meth)acrylic acid such as 2-t-butyl-aminoethyl methacrylate, and allylamine. Generally, this hydroxy- or amino-containing ethylenically unsaturated monomer will be at a 1:1 molar ratio to the chain transfer agent.

Representative reaction schemes are illustrated as follows in the case where p is one, and the polymers are based on a single hydrophilic monomeric precursor:

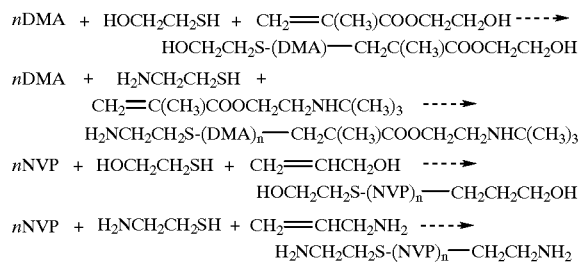

Representative reaction schemes are illustrated as follows in the case where p is one, and the polymers are based on two different hydrophilic monomeric precursors:

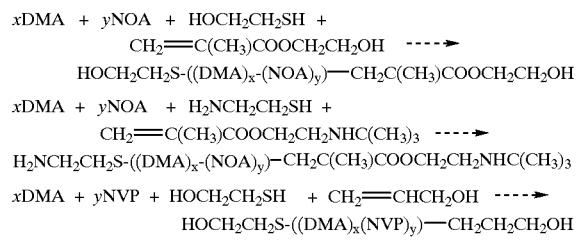

-continued $$x\text{DMA} + y\text{NVP} + \text{H}_2\text{NCH}_2\text{CH}_2\text{SH} + \text{CH}_2\!\!=\!\!\text{CHCH}_2\text{NH}_2 \longrightarrow$$
$$\text{H}_2\text{NCH}_2\text{CH}_2\text{S-}((\text{DMA})_x(\text{NVP})_y)\!\!-\!\!\text{CH}_2\text{CH}_2\text{NH}_2$$

In the above representative schemes,

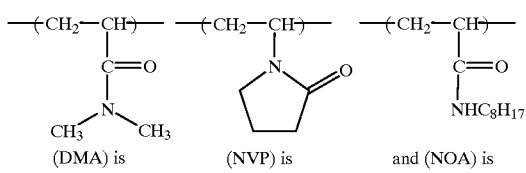

(DMA) is          (NVP) is          and (NOA) is

Such synthesis methods are generally known in the art, and representative detailed syntheses are described in the Examples.

The subject polymers are highly hydrophilic and are useful in a variety of applications. As a first example, the subject polymers can be used as precursors to form prepolymers useful as a contact lens material, Such materials are described more fully in U.S. Pat. No. 5,969,076, the disclosure of which is incorporated herein by reference. An example of such material is provided in Examples 8 and 9 below. As a second example, the subject polymers can be reacted with monomers containing epoxy, isocyanate, carboxylic acid, carboxylic acid chloride or anhydride functionality to form hydrophilic macromonomers useful in forming hydrogels. As yet another example, the polymers can be used to form a hydrophilic coating on an object such as a contact lens, an intraocular lens, a catheter or other biomedical devices, when such objects include functionality reactive with the hydroxy- or amilo- functionality of the subject polymers, such as the functional groups mentioned above.

As an illustration of the present invention, several examples are provided below. These examples serve only to further illustrate aspects of the invention and should not be construed as limiting the invention.

EXAMPLE 1

Synthesis of hydroxy-terminated polymer based on DMA (Theoretical Mn of 4000)

To a dried 500-ml round bottom flask was added N,N-dimethylacrylamide (DMA, 94.78 g/0.95 mole), 2-hydroxyetylmethacrylate (Hema, 3.27 g/0.0251 mole) and anhydrous tetrahydrofuran (THF, 200 ml). The contents were flushed with nitrogen and 2-mercaptoethanol (1.97 g/0.0251 mole) and 2,2-azobisisobutyronitrile (AIBN, 0.8 g/0.5 mole % of DMA) were added. The mixture was heated at 60° C. for 20 hours and poured into a beaker containing ether to precipitate the product. The product was vacuum dried to yield 92 grams. Size exclusion chromatography indicated Mn 2926 (number average molecular weight), MW 7466 (weight average molecular weight), with a polydispersity of 2.55. The hydroxy-equivalent weight as determined by titration (addition of excess isophorone diisocyanate to react with OH groups in the polymer, and then addition of excess di-n-butylamine to react with isocyanate groups, followed by titration with HCl) was 1870.

EXAMPLE 2

Synthesis of hydroxy-terminated polymer based on DMA (Theoretical Mn of 1000)

A polymer was prepared as in Example 1 employing the following amounts of reactants: DMA, 79.2 g/0.799 mole; Hema, 13 g/0.0959 mole; mercaptoethanol, 7.8 g/0.0959 mole; and AIBN, 0.5 mole % of DMA. The reactants were polymerized for 5 hours, and the hydroxy-equivalent weight as determined by titration was 480.

EXAMPLE 3

Synthesis of hydroxy-terminated polymer based on NVP (Theoretical Mn of 1000)

A polymer was prepared as in Example 1 employing the following amounts of reactants: N-vinylpyrrolidone (NVP), 86.43 g/0.78 mole; allyl alcohol, 5.79 g/0.0997 mole; mercaptoethanol, 7.79 g/0.099 mole; and AIBN, 0.5 mole % of NVP). The reactants were polymerized for 150 hours, and the hydroxy-equivalent weight as determined by titration was 594.

EXAMPLE 4

Synthesis of hydroxyl-terminated polymer based on DMA (Theoretical Mn of 1500)

A polymer was prepared as in Example 1 employing the following amounts of reactants: N,N-dimethylacrylamide (DMA, 100 g/1.009 mole); 2-hydroxyethyl methacrylate (Hema, 10.69 g/0.0841 mole); 2-mercaptoethanol (6.57 g/0.0841 mole); and 2,2-azobisisobutyronitrile (AIBN, 1.64 g/0.01 mole). The product was vacuum dried to yield 109.6 grams. Size exclusion chromatography indicated Mn 1483, MW 3416, with a polydispersity of 2.30.

EXAMPLE 5

Synthesis of hydroxyl-terminated polymer based on copolymer of DMA and NOA (Theoretical Mn of 1500)

A polymer was prepared as in Example 1 employing the following amounts of reactants: N,N-dimethylacrylamide (DMA, 17.7 g, 0.179 mole); N-octyl acrylamide (NOA, 6.6 g/0.0361 mole); 2-hydroxyethyl methacrylate (Hema, 2.3 g/0.0177 mole); 2-mercaptoethanol (1.4 g/0.0175 mole); and 2,2-azobisisobutyronitrile (AIBN, 0.2 g/0.5 mole % of DMA). The product was vacuum dried to yield the final product. Size exclusion chromatography indicated Mn 912, MW 2210, with a polydispersity of 2.43. The hydroxy-equivalent weight, as determined by titration, was 773, or Mn of 1546. IR (cm$^{-1}$): 3318, 2926, 2856, 1722, 1628, 1496, 1457, 1398, 1354, 1259, 1137, 1088, 1056, 730, and 699.

EXAMPLE 6

Synthesis of hydroxyl-terminated polymer based on DMA, (Theoretical Mn of 1500)

A polymer was prepared as in Example 1 employing the following amounts of reactants: N,N-dimethylacrylamide (DMA, 99.18 g/1.00 mole); 2-hydroxyethyl methacrylate (Hema, 7.17 g/0.055 mole); 2-mercaptoethanol (4.30 g/0.055 mole); and 2,2-azobisisobutyronitrile (AIBN, 1.64 g/0.5 mole % of DMA). The product was vacuum dried to yield the final product. Size exclusion chromatography indicated Mn 1549, MW 4394, with a polydispersity of 2.84. The hydroxy-equivalent weight, as determined by titration, was 818.

EXAMPLE 7

The glass transition temperatures of the two DMA-based polymers of Examples 5 and 6 were measured, using a differential scanning calorimetry instrument. The glass transition temperatures were 33° C. and 66.5° C., respectively, indicating that the polymer based on the DMA/NOA copolymer was softer.

EXAMPLE 8

Synthesis of the thermoplastic polymer employing the hydroxy-terminated prepolymer of Example 2

To a dried 3-neck round bottom 500-ml flask was added the hydroxyl-terminated prepolymer of Example 2 (4,8284 g/0.00504 mole) and 30 ml of dry methylene chloride. The mixture was stirred until complete dissolution. Then, α,ω-bis(hydroxybutyl) polydimethylsiloxane having an average molecular weight of about 5000 (PDMS, 20.3886 g/0.00504 mole), diethylene glycol (2.1441 g/0.0202 mole), isophorone diisocyanate (IPDI, 6.7243 g/0.03025 mole), dibuytltin dilaurate (0.1032 g) and 200 ml of methylene chloride were added. The contents were refluxed under nitrogen. Samples of the reaction product were taken periodically for measurement of IR spectrum, and the reaction was terminated after about 120 hours when the isocyanate peak (about 2270 cm$^{-1}$) disappeared from IR spectrum of the reaction product. The solvent was then stripped with methylene chloride under vacuum to give the polymeric product (number average molecular weight Mn 11400, molecular weight MW 43175 using polystyrene standard).

EXAMPLE 9

Synthesis of thermoplastic polymer employing the hydroxy-terminated prepolymer of Example 5

To a dried 3-neck round bottom 1-liter flask was added α,ω-bis(hydroxybutyl) polydimethylsiloxane having an average molecular weight of about 3700 (PDMS, 24.0905g), isophorone diisocyanate (IPDI, 0.7332 g), dibuytltin dilaurate (0.0742 g) and 100 ml of methylene chloride. The contents were refluxed under nitrogen for 22 hours until IR spectrum indicated absence of the isocyanate group from the reaction mixture. Separately, to a dried 3-neck round bottom 1-liter flask was added the hydroxyl-terminated prepolymer of Example 5 (6.77 g/0.004379 mole), IPDI (1.9678 g/0.008757, dibutyltin dilaurate (0.0264 g) and methylene chloride (18 ml). The contents were refluxed overnight, and titration indicated the isocyanate content had decreased to 40.2%. Then, the first reaction mixture was added to the second reaction mixture at a molar ratio of 1:2. After 20 hours, the isocyanate level decreased to 14.9%, and the contents were cooled to ambient temperature.

The thermoplastic polymers, such as those of Examples 8 and 9, generally include units represented by the formula (II):

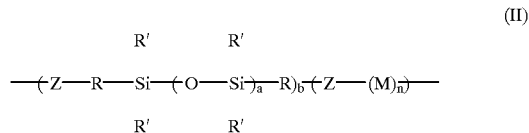

(II)

with one class of polymers including units represented by the formula (IIa):

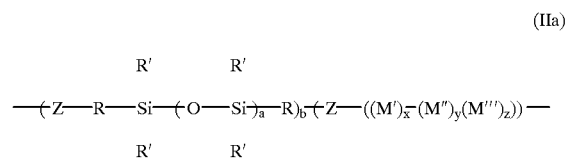

(IIa)

In formulae (II) and (IIa), each R is independently selected from an alkylene group having 1 to 10 carbon atoms wherein the carbon atoms may include ether, urethane or ureido linkages therebetween; each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween; a is an integer equal to or greater than 1; each Z is independently a divalent urethane or ureido segment; b is greater than or equal to 1, and c is greater than or equal to 1; and the remaining variables arc as defined for formulae (I) and (Ia).

As a further example, the subject prepolymers are useful as precursors in the preparation of (meth)acrylate- or (meth)acrylaniide-endcapped macromonomers having the following structure: (III)

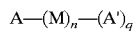

wherein;

A and A' are independently an ethylenically unsaturated radical; and M, n and p are as previously defined. One class of such prepolymers are those where the radical —(M)$_n$— in Formula (III) is represented by the radical —((M')$_x$—(M")$_y$(M''')$_y$)—, as in Formula (Ia).

More specifically, the prepolymers of Formula (I), containing the hydroxy- or amino-functionality attributed to the X and Y radicals, are reacted with a compound containing an ethylenically unsaturated radical, i.e., the macromonomer/polymer is endcapped with ethylenically unsaturated radicals A and A'. For example, reaction of the Formula (I) polymer with isocyanatoethyl (meth)acrylate or (meth)acryloyl chloride can provide a methacrylate end group, or vinyl chloro formate can provide a vinyl end group. Other combinations will be apparent to one skilled in the art. The resultant Formula (III) compounds are useful as co-monomers in forming hydrogel materials, such as hydrogel contact lens materials. The following examples illustrate preparation of various Formula (III) compounds.

EXAMPLE 10

Metacrylate-capped poly(DMA) through reaction with methacryloyl chloride

To a thoroughly dried 1 liter round bottom flask equipped with a reflux condenser, dropping funnel and mechanical stirrer, were added, under nitrogen atmosphere: the poly(DMA) polymer from Example 4 (50 g); triethylamine (7.7 grams); and ethyl acetate (400 ml). The contents were cooled to below 10° C. Then methacryloyl chloride (7.8 g) was added from the dropping funnel while maintaining the temperature of the mixture below 10° C. Then the temperature was allowed to rise to ambient and the contents were continually stirred overnight. Some precipitate was observed. The contents were diluted with chloroform until complete dissolution was obtained, then rotoevaporated and redissolved in chloroform, 70 g of basic aluminum oxide was added, and stirred overnight. Then, the contents were filtered and the filtrate was passed through 150 grams of silica gel and eluted with 50/50 methylene chloride/pentane. The combined solution was rotoevaporated to obtain a white solid. The solid was redissolved in THF and precipitated with addition of ether. The product collected was dried under vacuum. Recovered were 16 grams of final product, Mn of 3458 by size exclusion chromatography using polystyrene standards, IR (cm$^{-1}$): 2926, 1720, 1633, 1495, 1398, 1354, 1258, 1137, 1095, 1057, 728, 699.

EXAMPLE 11

Methacrylate-capped poly(DMA) through reaction with isocyanatoethyl methacrylate To a thoroughly dried 500 milliliter round bottom flask equipped with a reflux condenser dropping funnel and mechanical stirrer, were added under nitrogen atmosphere: the poly(DMA) polymer of Example 4 (12 g); BHT (0.02 g); isocyanatoethyl methacrylate (2.81 g); chloroform (200 ml); and dibutyltin dilaurate (0.54 g). The contents were heated at 45° C. for 6 hours. An aliquot was checked for presence of isocyanate. The contents were heated for another 2 hours and again checked for isocyanate presence with no change in isocyanate observed. Then 1 ml of methanol was added and the contents stirred at room temperature for 1 hour. The contents were then rotoevaporated to remove ⅓ of chloroform and them poured, with vigorous stirring, into 2500 ml of ether to precipitate the product. The stirring was continued for 15 minutes and the precipitate was allowed to settle. The product was then filtered, and dried under vacuum: Mn 2550, Mw 4300 by size exclusion chromatography using polystyrene standards, IR (cm$^{-1}$): 3297, 2927, 1719, 1635, 1496, 1398, 1354, 1257, 1137, 1095, 1058, 729 and 699.

Although various preferred embodiments have been illustrated, many other modifications and variations of the present invention are possible to the skilled practitioner. It is therefore understood that, within the scope of the claims, the present invention can be practiced other than as herein specifically described.

We claim:

1. A polymer of the formula:

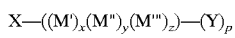

wherein:
X is derived from a chain transfer agent and includes a terminal hydroxyl or amino radical;
Y is derived from an ethylenically unsaturated monomer that includes a terminal hydroxyl or amino radical;
M' is derived from a first hydrophilic ethylenically unsaturated monomer;
M" is derived from a second different hydrophilic ethylenically unsaturated monomer;
M'" is derived from a hydrophobic ethylenically unsaturated monomer;
each of x and y is at least one, and x+y is about 5 to 50;
z is 0 to 20; and
p is 0 to 5.

2. The polymer of claim 1, wherein X is derived from mercaptoalcohols and aminomercaptans.

3. The polymer of claim 2, wherein X has the formula HOCH$_2$CH$_2$S— or H$_2$NCH$_2$CH$_2$S—.

4. The polymer of claim 1, wherein Y is derived from 2-hydroxyethyl methacrylate, allyl alcohol, 2-t-butylaminoethyl methacrylate, or allylamine.

5. The polymer of claim 4, wherein Y has the formula —CH$_2$—C(CH$_3$)COOCH$_2$CH$_2$OH, —CH$_2$C(CH$_3$)COOCH$_2$CH$_2$NHC(CH$_3$)$_3$, —CH$_2$CH$_2$ CH$_2$OH, or —CH$_2$CH$_2$ CH$_2$NH$_2$.

6. The polymer of claim 1, wherein (M') has the formula:

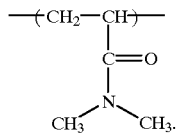

7. The polymer of claim 6, wherein (M") has the formula:

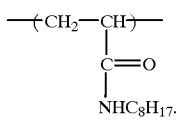

8. The polymer of claim 1, wherein (M') has the formula:

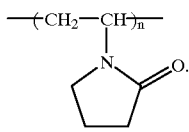

9. The polymer of claim 7, wherein p is one and z is zero.
10. The polymer of claim 1, wherein p is one and z is zero.
11. A macromonomer of the formula:

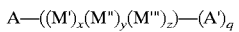

wherein:
A and A' are independently an ethylenically unsaturated radical;
M' is derived from a first hydrophilic ethylenically unsaturated monomer;
M" is derived from a second different hydrophilic ethylenically unsaturated monomer;
M'" is derived from a hydrophobic ethylenically unsaturated monomer;
each of x and y is at least one, and x+y is about 5 to 50;
z is 0 to 20; and
q is 0 to 5.

12. The macromonomer of claim 11, wherein q is one and z is zero.

13. A thermoplastic polymer including units of the formula:

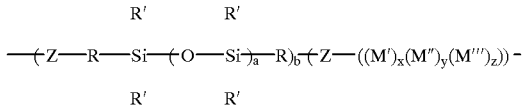

wherein:
each R is independently selected from an alkylene group having 1 to 10 carbon atoms wherein the carbon atoms may include ether, urethane or ureido linkages therebetween;
each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;
a is an integer equal to or greater than 1;
each Z is independently a divalent urethane or ureido segment; b is greater than or equal to 1, and c is greater than or equal to 1;
M' is derived from a first hydrophilic ethylenically unsaturated monomer;
M" is derived from a second different hydrophilic ethylenically unsaturated monomer;
M'" is derived from a hydrophobic ethylenically unsaturated monomer;
each of x and y is at least one, and x+y is about 5 to 50; and z is 0 to 20.

* * * * *